United States Patent
Kim et al.

(10) Patent No.: US 8,224,171 B2
(45) Date of Patent: Jul. 17, 2012

(54) METHOD AND APPARATUS FOR DRIVING LENS BARREL, DIGITAL PHOTOGRAPHING APPARATUS, AND COMPUTER-READABLE STORAGE MEDIUM

(75) Inventors: Chang-jin Kim, Yongin-si (KR); Byoung-kwon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/909,021

(22) Filed: Oct. 21, 2010

(65) Prior Publication Data

US 2011/0097066 A1 Apr. 28, 2011

(30) Foreign Application Priority Data

Oct. 26, 2009 (KR) .......................... 10-2009-0101729

(51) Int. Cl.
*G03B 13/34* (2006.01)

(52) U.S. Cl. ........................... 396/87; 396/134; 359/697

(58) Field of Classification Search .................... 396/87, 396/134; 359/697
See application file for complete search history.

(56) References Cited

U.S. PATENT DOCUMENTS

| RE33,016 | E | * | 8/1989 | Ishikawa et al. | 396/110 |
| 5,148,201 | A | * | 9/1992 | Umetsu et al. | 396/86 |
| 5,367,354 | A | * | 11/1994 | Kawasaki et al. | 396/86 |
| 5,614,972 | A | * | 3/1997 | Wakabayashi et al. | 396/135 |

* cited by examiner

*Primary Examiner* — W. B. Perkey
(74) *Attorney, Agent, or Firm* — Drinker Biddle & Reath LLP

(57) ABSTRACT

A method of driving a lens barrel includes detecting a movement detection signal that indicates an operation of the lens barrel which operates using a stepping motor; determining a limit time during which movement of a lens barrel component is detected based on the movement detection signal; detecting the movement from the movement detection signal; and changing a driving level of the stepping motor from a first driving level to a second driving level when movement of the lens barrel component is not detected from the movement detection signal within the limit time, wherein torque of the second driving level is greater than torque of the first driving level.

14 Claims, 6 Drawing Sheets

FIG. 7

METHOD AND APPARATUS FOR DRIVING LENS BARREL, DIGITAL PHOTOGRAPHING APPARATUS, AND COMPUTER-READABLE STORAGE MEDIUM

CROSS-REFERENCE TO RELATED PATENT APPLICATION

This application claims the priority benefit of Korean Patent Application No. 10-2009-0101729, filed on Oct. 26, 2009, in the Korean Intellectual Property Office, the disclosure of which is incorporated herein in its entirety by reference.

BACKGROUND

1. Field of the Invention

Embodiments relate to an apparatus and method for driving a lens barrel, a digital photographing apparatus including the lens barrel driving apparatus, and a computer readable medium storing a computer program for executing the method of driving a lens barrel.

2. Description of the Related Art

A digital photographing apparatus generates an image file from an optical signal that is incident through an aperture and a lens included in a lens barrel. In order to focus the optical signal incident from a subject, on a light receiving surface of an image pickup device, the digital photographing apparatus may adjust a position of a lens.

SUMMARY

An apparatus for driving a lens barrel, a digital photographing apparatus including the apparatus for driving the lens barrel, a method of driving the lens barrel, and a non-transitory computer readable storage medium having stored thereon a program executable by a processor for performing the method of driving the lens barrel overcome a failure of driving the lens barrel.

According to an embodiment, a method of driving a lens barrel includes detecting a movement detection signal that indicates an operation of the lens barrel which operates using a stepping motor; determining a limit time during which movement of a lens barrel component is detected based on the movement detection signal; detecting the movement from the movement detection signal; and changing a driving level of the stepping motor from a first driving level to a second driving level when movement of the lens barrel component is not detected from the movement detection signal within the limit time, wherein torque of the second driving level is greater than torque of the first driving level.

The movement detection signal may be provided from a photo interrupter or a photo reflector included in the lens barrel. The detecting of the movement may include detecting the movement of the lens barrel component from an edge at which a logic level of the movement detection signal changes.

The determining a limit time may include determining the limit time according to a logic level of the movement detection signal. The method may further include determining a driving direction of the lens barrel according to a logic level of the movement detection signal.

The method may further include, after the changing a driving level, detecting the movement detection signal from the lens barrel when the lens barrel operates in the second driving level; determining a limit time with respect to the second driving level; detecting the movement of the lens barrel component from the movement detection signal when the lens barrel operates in the second driving level; and determining that driving of the lens barrel is not successful when the movement of the lens barrel component is not detected from the movement detection signal within the limit time with respect to the second driving level.

According to another embodiment, a lens barrel driving apparatus includes a movement detection signal detecting unit configured to detect a movement detection signal that indicates an operation of a lens barrel that operates using a stepping motor; a limit time determining unit configured to determine a limit time during which movement of a lens barrel component is detected based on the movement detection signal; a movement detection unit configured to detect movement of the lens barrel component from the movement detection signal; and a driving level changing unit configured to change a driving level of the stepping motor from a first driving level to a second driving level when movement of the lens barrel component is not detected from the movement detection signal within the limit time, wherein torque of the second driving level is greater than torque of the first driving level.

The lens barrel driving apparatus according to the embodiments may be included in a digital photographing apparatus, which may also include an image pickup device on which an image of a subject is formed from an optical signal transmitted through a lens barrel.

According to another embodiment, a non-transitory computer readable storage medium has stored thereon a program executable by a processor for performing a method of driving a lens barrel according to the embodiments.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described with reference to the attached drawings. The description below and the attached drawings are provided for better understanding of operations of the embodiments, and elements that may be easily realized by one of ordinary skill in the art may be omitted.

Also, the embodiments and the drawings are not for purposes of limitation, and thus the scope of the invention is defined by the appended claims. The meaning of the terms used in the instant specification and claims should be construed as meanings and concepts not departing from the spirit and scope of the invention based on the principle that the inventor is capable of defining concepts of terms in order to describe his or her invention in the most appropriate way.

Figure 1:
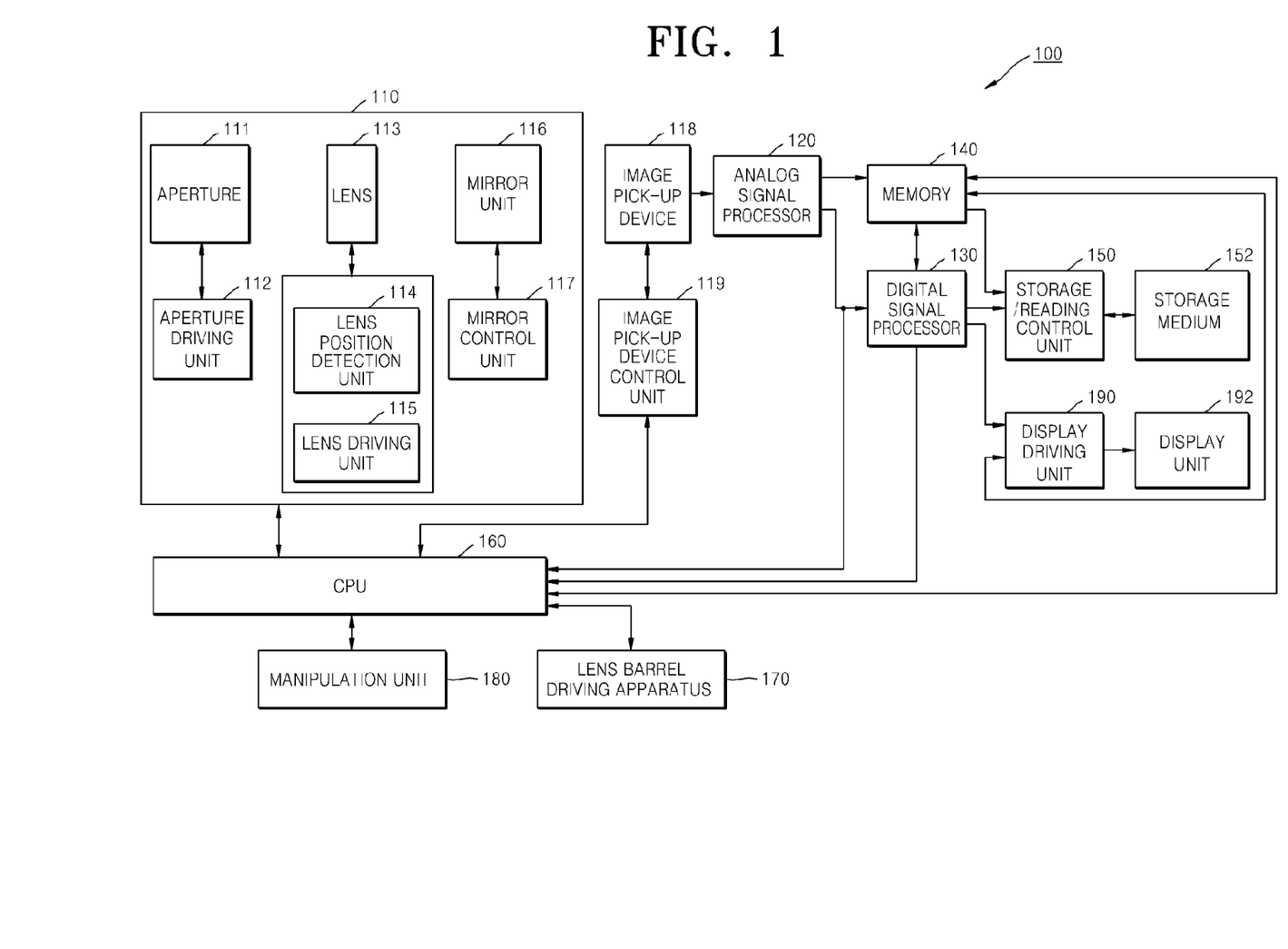
FIG. 1 is a block diagram of a digital photographing apparatus including a lens barrel driving apparatus, according to an embodiment.

FIG. 1 is a block diagram of a digital photographing apparatus 100 including a lens barrel driving apparatus 170, according to an embodiment.

The lens barrel driving apparatus 170 drives a lens barrel 110 that includes a stepping motor (not shown). For example, the lens barrel driving apparatus 170 may be included in the digital photographing apparatus 100 including the lens barrel 110. The lens barrel driving apparatus 170 receives a movement detection signal from the lens barrel 110 to detect movement of components in the lens barrel 110. If no movement is detected, the lens barrel driving apparatus 170 changes a driving level of the lens barrel 110.

The digital photographing apparatus 100 may include the lens barrel 110, an image pickup device 118, an image pickup device control unit 119, an analog signal processor 120, a digital signal processor 130, a memory 140, a storage/reading control unit 150, a storage medium 152, a CPU 160, the lens barrel driving apparatus 170, a manipulation unit 180, a display driving unit 190, and a display unit 192.

The overall operation of the digital photographing apparatus 100 is controlled by the CPU 160. The CPU 160 provides to the lens barrel 110, the image pickup device control unit 119, the lens barrel driving apparatus 170, etc., a control signal needed to operate them. A driving level of the lens barrel driving apparatus 170 and a structure of the lens barrel driving apparatus 170 will be described in detail below.

The digital photographing apparatus 100 may be a lens interchangeable camera or a compact camera. Accordingly, the lens barrel 110 may be detachable from a body of the digital photographing apparatus 100 or be integrated with the digital photographing apparatus 100. The lens barrel 110 includes an aperture 111, an aperture driving unit 112, a lens 113, a lens position detection unit 114, a lens driving unit 115, a mirror unit 116, and a mirror control unit 117.

The degree of opening of the aperture 111 is adjusted by the aperture driving unit 112 to adjust an amount of light that is incident to the image pickup device 118.

The lens 113 may include a plurality of lenses such as a zoom lens, a focus lens, or the like. A position of the lens 113 is adjusted by the lens driving unit 115.

The lens driving unit 115 adjusts the position of the lens 113 according to a control signal provided by the CPU 160. The lens driving unit 115 may include the stepping motor for moving the lens 113. The stepping motor may be driven according to a plurality of driving levels. The lens driving unit 115 may control the driving level the stepping motor. For example, the stepping motor may be driven, for example, using a micro step level, a 12-phase level, or a 2-phase level, or using driving levels having different numbers of micro steps from each other.

The lens position detection unit 114 detects a position of the lens 113 to generate a movement detection signal. The lens position detection unit 114 may include a photo interrupter or a photo reflector. When the lens 113 includes a plurality of lenses, the lens position detection unit 114 may output the movement detection signal with respect to each of the plurality of lenses.

The mirror control unit 117 adjusts the mirror unit 116 to adjust a direction of light that is incident to the lens barrel 110.

An optical signal that has transmitted through the lens barrel 110 arrives on a light receiving surface of the image pickup device 118, thereby forming an image of a subject. The image pickup device 118 may be a charge-coupled device (CCD) or a complementary metal-oxide semiconductor image sensor (CIS) that converts an optical signal into an electrical signal. The sensitivity of the image pickup device 118 may be adjusted by the image pickup device control unit 119. The image pickup device control unit 119 may control the image pickup device 118 according to a control signal that is automatically generated by an image signal that is input in real-time, or a control signal that is manually input by manipulation of the user.

The exposure time of the image pickup device 118 is adjusted by a shutter (not shown). The shutter may be a mechanical shutter that moves a screen to adjust incident light or an electronic shutter that controls exposure by supplying an electrical signal to the image pickup device 118.

The analog signal processor 120 performs noise reduction, gain adjustment, waveform typifying, analog-to-digital conversion processing, etc. with respect to an analog signal that is supplied from the image pickup device 118. Alternatively, the analog signal processor 120 may be omitted according to the characteristics of the image pickup device 118.

The manipulation unit 180 is a unit through which a control signal is input from the outside, for example, by the user. The manipulation unit 180 may include various functional buttons such as a shutter-release button for inputting a shutter-release signal for capturing an image by exposing the image pickup device 118 for a predetermined period of time, a power button for inputting a control signal for turning on or off the digital photographing apparatus 100, a wide angle-zoom button and a telephoto-zoom button for widening or narrowing an angle of view according to an input signal, and functional buttons etc., for a white balance setup function selection, for an exposure setup function, for mode selection of a text input mode, a photographing mode, or a replay mode, etc. The manipulation unit 180 may have various buttons as described above, but is not limited thereto. The manipulation 180 may be in any form such as a keyboard, a touch pad, a touch screen, a remote controller, etc., through which a user may input a control signal.

Data transmitted from the image pickup device 118 may be input to the digital signal processor 130 via the memory 140 or not via the memory 140, or to the CPU 160 as appropriate in an application. Examples of the memory 140 include a read-only memory (ROM) and a random access memory (RAM). The digital signal processor 130 may perform digital signal processing such as gamma correction and white balance adjustment.

Image data output from the digital signal processor 130 is transmitted directly to the display driving unit 190 or via the memory 140. The display driving unit 190 controls the display unit 192 to display an image on the display unit 192. Also, image data output from the digital signal processor 130 is directly input to the storage/reading control unit 150 or via the memory 140. The storage/reading control unit 150 stores image data to the storage medium 152 according to a signal transmitted from a user or automatically. Also, the storage/reading control unit 150 may read data regarding an image from an image file stored in the storage medium 152 and input the data via the memory 140 or other paths to the display driving unit 190, thereby displaying the image on the display unit 192. The storage medium 152 may be detachable or permanently mounted to the digital photographing apparatus 100.

Figure 2:
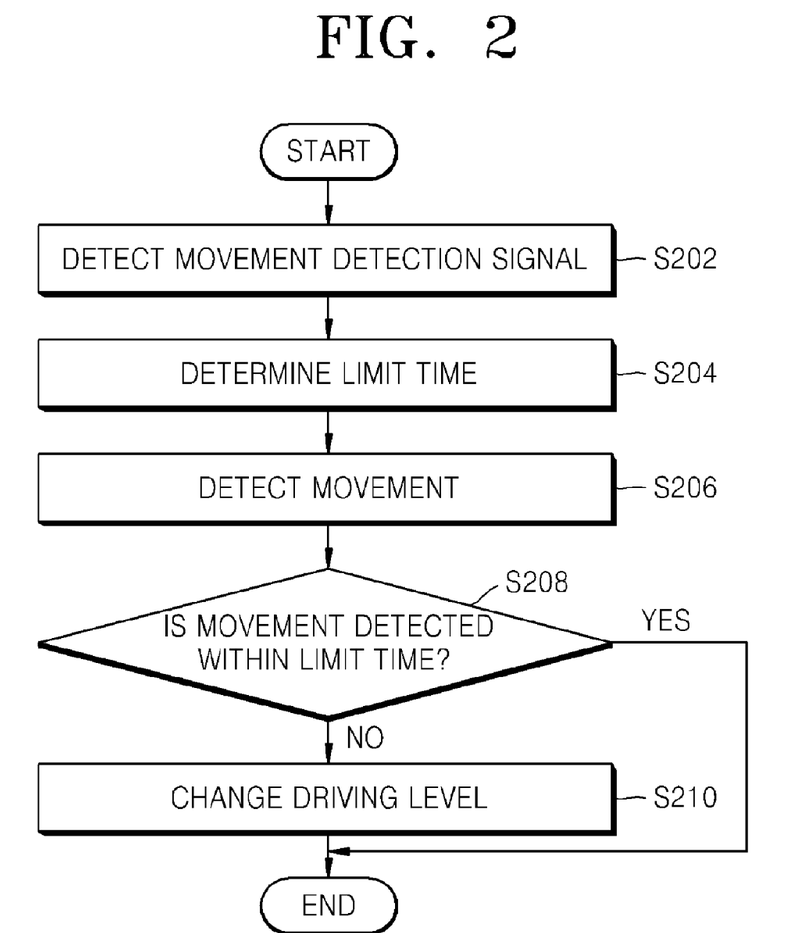
FIG. 2 is a flowchart illustrating a method of driving a lens barrel, according to an embodiment.

FIG. 2 is a flowchart illustrating a method of driving a lens barrel, according to an embodiment.

In operation S202, a movement detection signal provided by the lens barrel 110 is detected. A movement detection signal is a signal that indicates movement of components mounted in the lens barrel 110, such as a zoom lens, a focus lens, etc., as the components move inside the lens barrel 110.

For example, when the lens position detection unit 114 includes a photo interrupter or a photo reflector, the movement detection signal is a sensing signal output by the photo interrupter or the photo reflector.

In operation S204, when the movement detection signal is detected, a limit time for determining whether the lens barrel 110 has been successfully driven is determined.

In operation S206, when the limit time is determined, movement of the components in the lens barrel 110 is detected based on the movement detection signal. For example, when the movement detection signal is output by the photo interrupter or the photo reflector, and when a rising/falling edge is detected from the movement detection signal, it is determined that the components in the lens barrel 110 have moved.

Next, in operation S208, whether the movement is detected within the limit time is determined based on the movement detection signal. In operation S210, if movement is not detected within the limit time, it indicates that the lens barrel 110 is not normally operated, and thus a driving level of a stepping motor in the lens barrel 110 is changed from a first driving level to a second driving level, where torque of a stepping motor of the second driving level is greater than that of the first driving level.

When the digital photographing apparatus 100 is turned on, and an error exists in the lens barrel 110, the digital photographing apparatus 100 is turned on and thus a power source LED which indicates an on/off state of the digital photographing apparatus 100 is lit but the display unit 192 stays black because of the error. Also, when the digital photographing apparatus 100 operates at a low temperature, a stepping motor may malfunction, and the lens barrel 110 may malfunction due to the error of the lens barrel 110 that is caused by external shock applied to the lens barrel 110. Accordingly, driving of the components mounted in the lens barrel 110, which is performed to initialize the lens barrel 110 or to drive the lens barrel 110, may fail. According to the embodiments, a driving level of a stepping motor of the lens barrel 110 is changed, thereby increasing the torque of the stepping motor. Consequently, a failure rate of driving of a lens barrel is significantly reduced by changing the driving level of the lens barrel 110.

Figure 3:
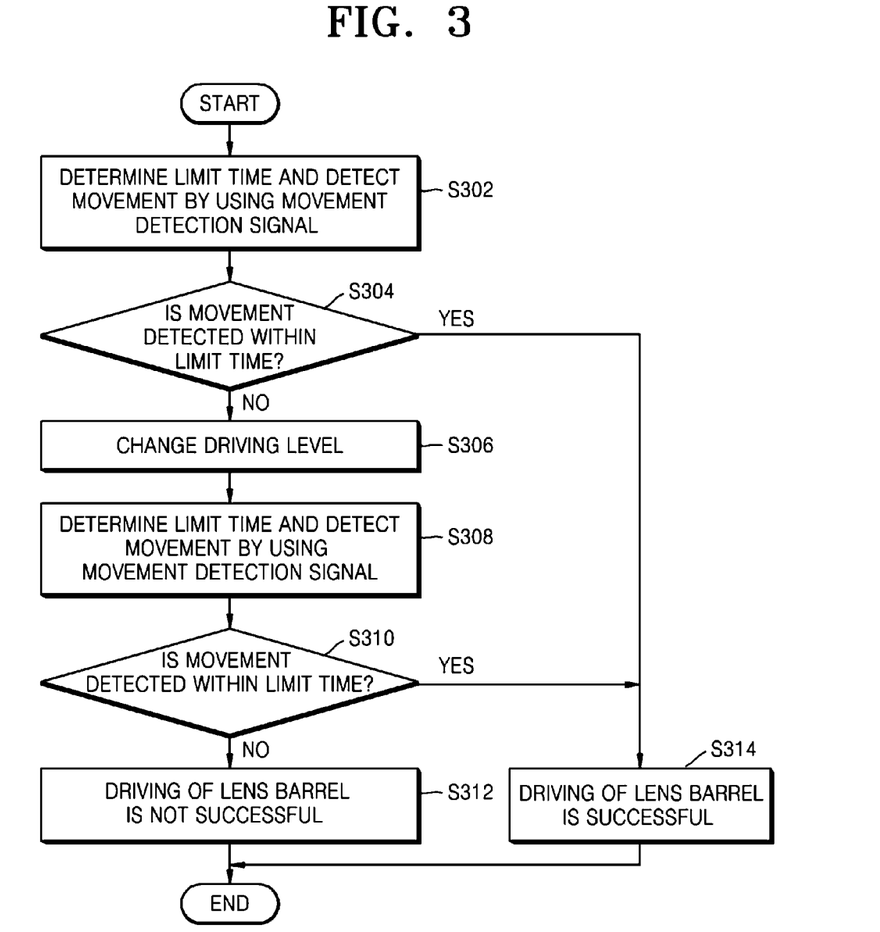
FIG. 3 is a flowchart illustrating a method of driving a lens barrel, according to another embodiment.

FIG. 3 is a flowchart illustrating a method of driving a lens barrel, according to another embodiment.

Figure 4:
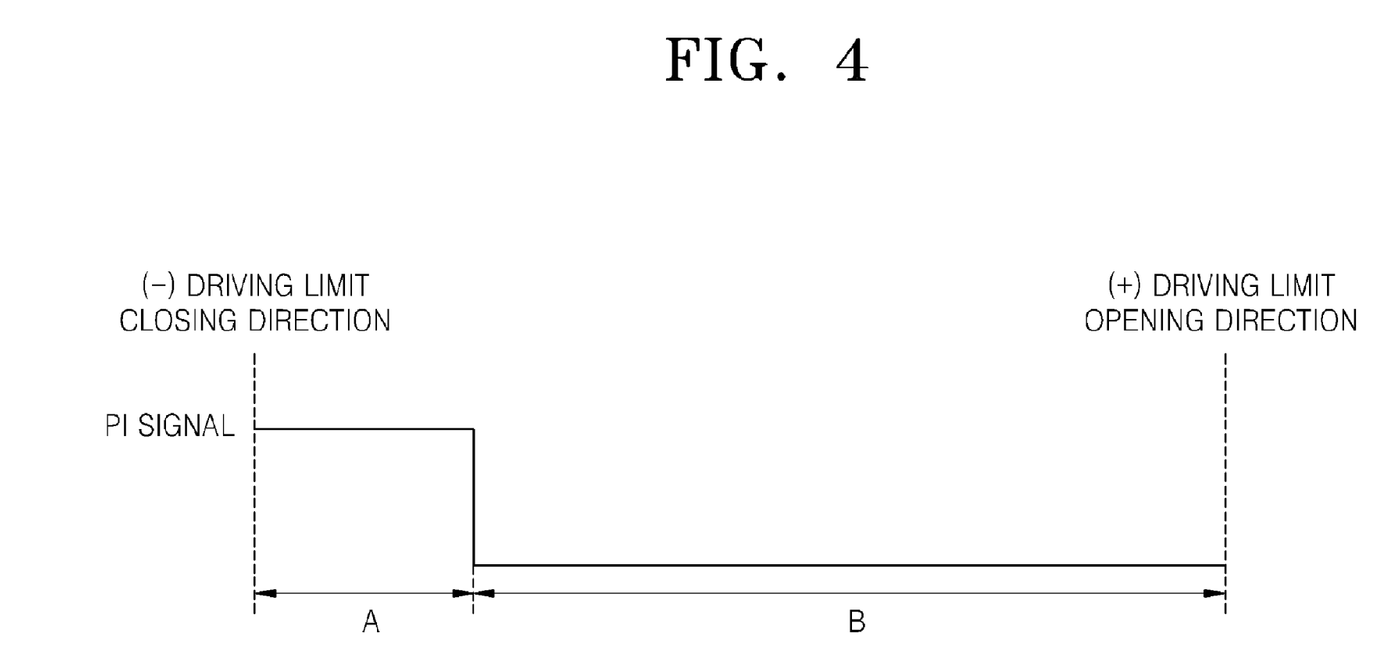
FIG. 4 illustrates an exemplary waveform of a PI signal output by a photo interrupter.

In the method of driving a lens barrel, according to the current embodiment, a movement detection signal is used to determine a limit time, and movement of components mounted in a lens barrel 110 are detected from the movement detection signal in operation S302. The movement detection signal may be a signal (PI signal) output from a photo interrupter as illustrated in FIG. 4. Operation S302 will be described below with reference to an example in which the movement detection signal is a PI signal and FIG. 5.

Figure 5:
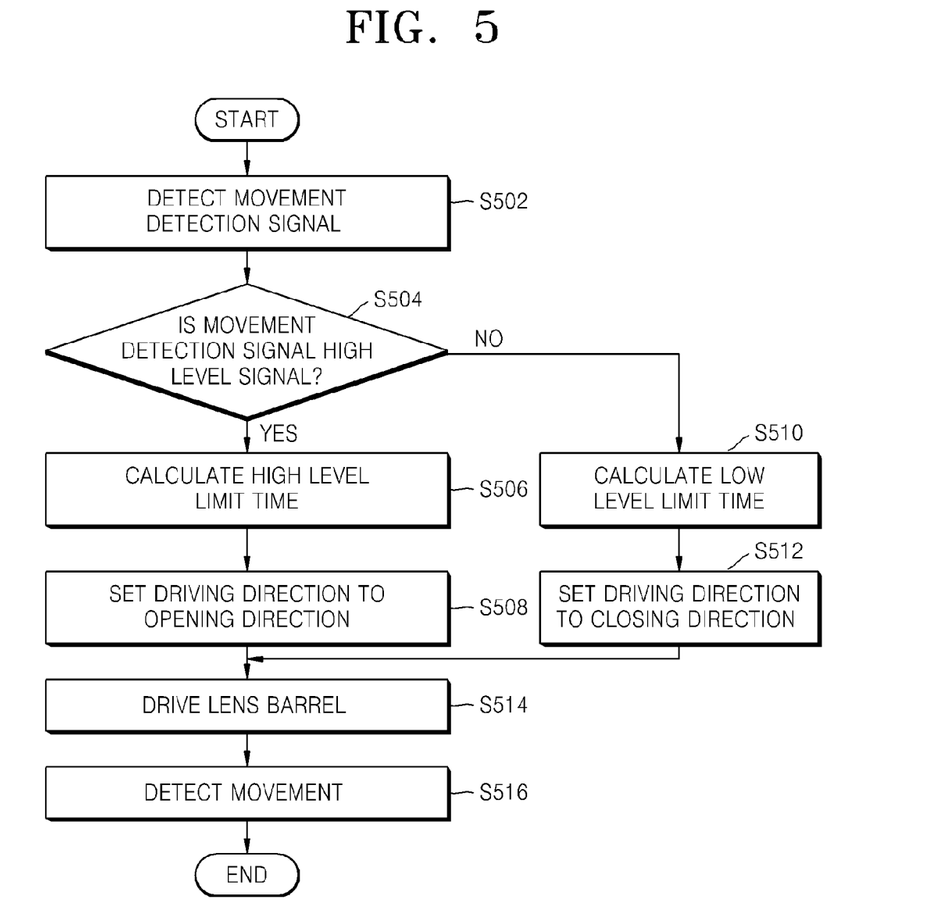
FIG. 5 is a detailed flowchart illustrating operation S302 of FIG. 3 when a movement detection signal is the PI signal, according to an embodiment.

FIG. 4 illustrates an exemplary waveform of a PI signal output by a photo interrupter. FIG. 5 is a detailed flowchart illustrating operation S302 when a movement detection signal is the PI signal, according to an embodiment.

Referring to FIG. 4, the PI signal may have a high level or a low level. When the PI signal is changed from a high level to a low level or from a low level to a high level, it may be determined as that the components in the lens barrel 110 have moved.

In operation S302 including determining a limit time and detecting movement, respectively, by using a movement detection signal, a PI signal which is a movement detection signal is first detected in operation S502.

Afterwards, the limit time and a driving direction of the components in the lens barrel 110 are determined based on a level of the PI signal.

In detail, when the PI signal is a high level signal in operation S504, a high level limit time is calculated in operation S506. The high level limit time may be calculated based on a maximum distance A at which the PI signal at a high level may be detected, and a movement speed of the components in the lens barrel 110. For example, when a maximum distance at which a high level PI signal may be detected is A, and a movement speed of the components in the lens barrel 110 is v, the high level limit time is A/v. The movement speed may vary according to the driving level of the stepping motor of the lens barrel 110. Also, when the PI signal is a high level signal in operation S504, a driving direction of the components in the lens barrel 110 is set to an opening direction in operation S508. This is because a falling edge of the PI signal may be detected by moving the components in the lens barrel 110 to the opening direction if the PI signal is a high level signal.

When the PI signal is a low level signal in operation S504, a low level limit time is calculated in operation S510. The low level limit time may be calculated based on a maximum distance B at which the PI signal at a low level may be detected, and a movement speed of the components in the lens barrel 110. For example, when a maximum distance at which a low level PI signal may be detected is B, and a movement speed of the components in the lens barrel 110 is v, the low level limit time is B/v. Also, when the PI signal is a low level signal in operation S504, a driving direction of the components in the lens barrel 110 is set to a closing direction in operation S512. This is because a rising edge of the PI signal may be detected by moving the components in the lens barrel 110 to the closing direction if the PI signal is a low level signal.

However, the driving direction according to the level of the PI signal may vary according to the configuration of the digital photographing apparatus 100, and is not limited to the one of the above-described embodiment.

Next, the components in the lens barrel 110 are driven according to the above-determined driving direction in operation S514. For example, when a component in the lens barrel 110 is the lens 113, the lens 113 is moved.

While moving the components of the lens barrel 110, a rising/falling edge is detected from the PI signal to thereby detect movement of the components of the lens barrel 110 in operation S516.

As described above with reference to FIG. 5, the operation S302 illustrated in FIG. 3 of determining a limit time and detecting movement based on the movement detection signal may be performed. Next, based on the limit time determined according to the level of the movement detection signal, whether movement of the components of the lens barrel 110 is detected within the limit time is determined in operation S304.

If movement of the components of the lens barrel 110 is detected within the limit time in operation S304, the method of driving the lens barrel 110 according to the current embodiment determines that the driving of the lens barrel is successful and the method is ended in operation S314.

Otherwise, If movement of the components of the lens barrel 110 is not detected within the limit time in operation S304, the driving level of a stepping motor of the lens barrel 110 is changed from a first driving level to a second driving level in operation S306, thereby increasing torque of the stepping motor. For example, it is assumed that examples of the driving level of the stepping motor include a micro step level of a maximum division number of K, a micro step level of a maximum division number of M, a 12-phase level, and a 2-phase level, and torque of the stepping motor increases according to the above stated order of the levels. Thus, when the first driving level is a micro step method of a maximum division number of K, and movement of the components of the lens barrel 110 is not detected within the limit time, the second driving level may be a micro step method of a maximum division number of M.

When the driving level of the stepping motor is changed to the second driving level in operation S306, then a limit time is determined with respect to the second driving level and movement is detected by using a movement detection signal in the second driving method again in operation S308. Operation S308 is the same as operation S302 described above. However, as the driving level of the stepping motor changes, a movement speed of the components of the lens barrel 110 may vary, and accordingly, a high level limit time and a low level limit time may be calculated differently from the first driving level.

Also, alternatively, the high level time limit and the low level time limit may be determined according to the driving level of the stepping motor and be stored in advance.

Next, whether movement of the components of the lens barrel 110 is detected within the limit time is determined in operation S310.

If movement of the components of the lens barrel 110 is detected within the limit time in the second driving level in operation S310, it is determined that driving of the lens barrel 110 is successful in operation S314. Otherwise, if movement of the components of the lens barrel 110 is not detected within the limit time in the second driving level in operation S310, it is determined that driving of the lens barrel 110 is not successful in operation S312.

Figure 6:
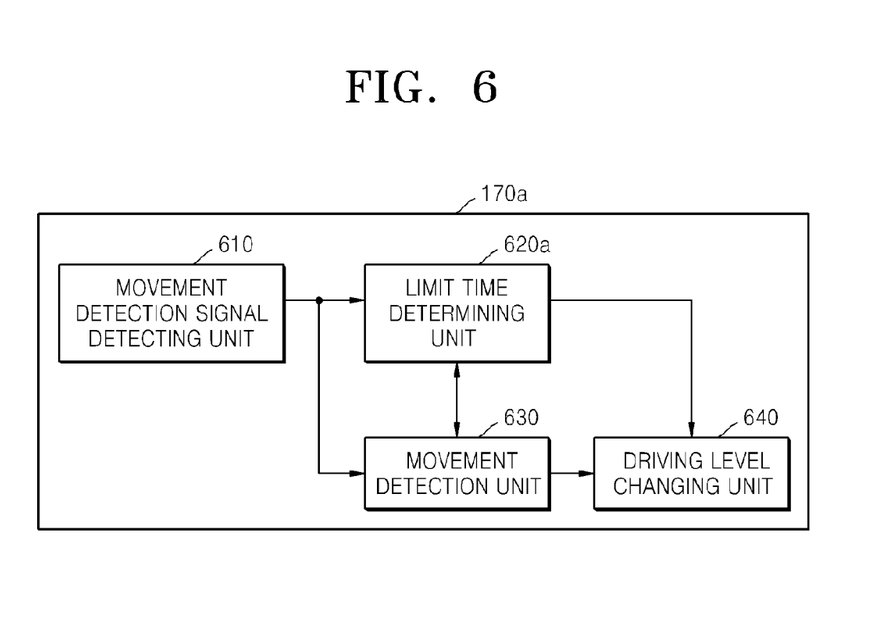
FIG. 6 is a block diagram of a lens barrel driving apparatus, according to an embodiment.

FIG. 6 is a block diagram of a lens barrel driving apparatus 170*a*, according to an embodiment.

The lens barrel driving apparatus 170*a* includes a movement detection signal detecting unit 610, a limit time determining unit 620*a*, a movement detection unit 630, and a driving level changing unit 640.

The movement detection signal detecting unit 610 detects a movement detection signal provided from the lens barrel 110. The movement detection signal is a signal that indicates movement of the components of the lens barrel 110, such as a zoom lens, a focus lens, etc. as the components move inside the lens barrel 110.

When the movement detection signal is detected, the limit time determining unit 620*a* determines a limit time for determining whether driving of the lens barrel 110 is successful or not.

When the limit time is determined, the movement detection unit 630 detects movement of the components in the lens barrel 110 from the movement detection signal. For example, when the movement detection signal is a signal output from a photo interrupter or a photo reflector, and a rising/falling edge is detected from the movement detection signal, it is determined as that the components of the lens barrel 110 have moved.

The driving level changing unit 640 determines whether movement of the components of the lens barrel 110 is detected within the limit time from the movement detection signal. If movement is not detected within the limit time, it indicates that the lens barrel 110 is not operating normally, and thus the driving level of the stepping motor of the lens barrel 110 is changed from a first driving level to a second driving level. Torque of the stepping motor of the second driving level is greater than in the first driving level. For example, it is assumed that examples of the driving level of the stepping motor includes a micro step level of a maximum division number of K, a micro step level of a maximum division number of M, a 12-phase level, and a 2-phase level and that torque of the stepping motor increases according to the above stated order of the levels. When the first driving level is a micro step of a maximum division number of K, and movement of the components of the lens barrel 110 is not detected, the second driving level may be a micro step of a maximum division number of M.

Figure 7:
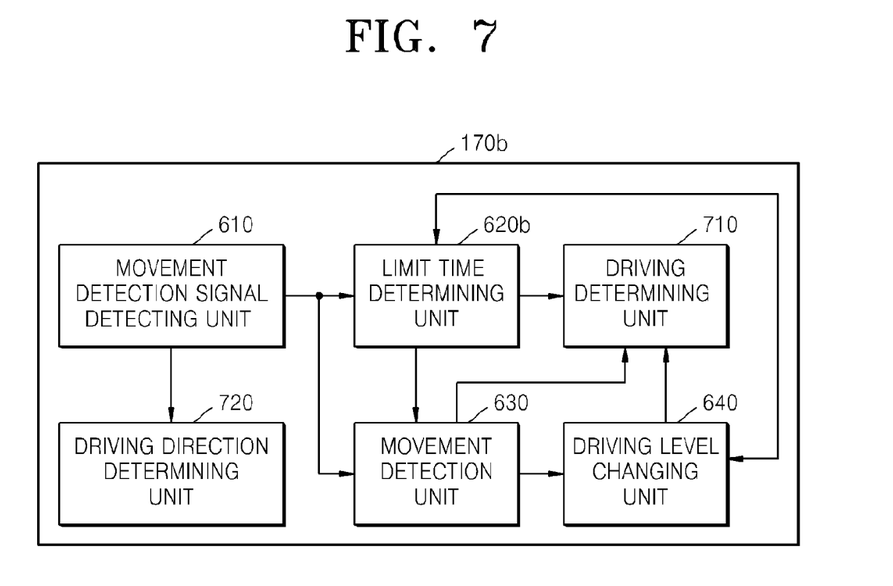
FIG. 7 is a block diagram of a lens barrel driving apparatus, according to another embodiment.

FIG. 7 is a block diagram of a lens barrel driving apparatus 170*b*, according to another embodiment.

The lens barrel driving apparatus 170*b* includes a movement detection signal detecting unit 610, a limit time determining unit 620*b*, a movement detection unit 630, a driving level changing unit 640, a driving determining unit 710, and a driving direction determining unit 720.

The limit time determining unit 620*b* according to the current embodiment determines a limit time by using a movement detection signal. The limit time determining unit 620*b* determines a limit differently according to the level of the movement detection signal if the movement detection signal is the PI signal. That is, the limit time determining unit 620*b* calculates a high level limit time when the PI signal is a high level signal, and calculates a low level time limit when the PI signal is a low level signal. The high level time limit may be calculated based on a maximum distance A at which a high level PI signal may be detected and a movement speed of the components of the lens barrel 110. For example, if the maximum distance at which a high level PI signal may be detected is A, and a movement speed of the components in the lens barrel 110 is v, the high level limit time is A/v. The movement speed may vary according to the driving level of the stepping motor. The low level time limit may be calculated based on a maximum distance B at which a low level PI signal may be detected and a movement speed of the components of the lens barrel 110. For example, if a maximum distance at which a low level PI signal may be detected is B, and a movement speed of the components in the lens barrel 110 is v, the low level limit time is B/v.

Also, when the driving level is changed from the first driving level to the second driving level by the driving level changing unit 640, the limit time determining unit 620*b* calculates a limit time with respect to the second driving level. Also, alternatively, the high level time limit and the low level time limit may be determined in advance and stored according to the driving level of the stepping motor. The limit time determining unit 620*b* may determine a limit time by using the previously stored high level time limit and low level time limit.

The driving direction determining unit 720 determines a driving direction of the components of the lens barrel 110 according to a movement detection signal, which will be described with reference to an example in which the movement detection signal is a PI signal as illustrated in FIG. 4. The driving direction determining unit 720 sets the driving direction of the components of the lens barrel 110 to an opening direction when the PI signal is a high level signal, and sets to a closing direction when the PI signal is a low level signal.

The lens barrel 110 drives the components in the lens barrel 110 according to the driving direction that is determined by the driving direction determining unit 720. For example, when a component of the lens barrel 110 is a lens 113, the lens driving unit 115 moves the lens 113.

When movement of the components of the lens barrel 110 is detected within the limit time in the first driving level or the second driving level, the driving determining unit 710 determines that driving of the lens barrel 110 is successful. Also, when movement of the components of the lens barrel 110 is not detected within the limit time from the second driving level, the driving determining unit 710 determines that driving of the lens barrel 110 is not successful.

According to the embodiments, when driving of a lens barrel fails, a method of driving the lens barrel is changed, thereby significantly reducing the failure rate of the lens barrel by changing a driving level of a stepping motor of the lens barrel.

A program for executing methods of driving a lens barrel according to the present embodiments and embodiments modified thereof may be stored in a non-transitory computer readable storage medium. Here, the storage medium may be read using the CPU 160 as shown in FIG. 1, for example. Any processes may be implemented as software modules or algorithms, and may be stored as program instructions or computer readable codes executable on a processor on a non-transitory computer-readable storage media such as flash memory, read-only memory (ROM), random-access memory (RAM), CD-ROM's, DVD's, magnetic tapes, floppy disks, hard disks, and optical data storage devices. The computer readable storage medium can also be distributed over network coupled computer systems so that the computer readable code is stored and executed in a distributed fashion. This computer readable code can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving a lens barrel, the method comprising:
    detecting a movement detection signal that indicates an operation of the lens barrel which operates using a stepping motor, the movement detection signal provided from a photo interrupter or a photo reflector comprised in the lens barrel;
    determining a limit time during which movement of a lens barrel component is detected based on the movement detection signal;
    detecting the movement from the movement detection signal;
    determining a driving direction of the lens barrel according to a logic level of the movement detection signal; and
    changing a driving level of the stepping motor from a first driving level to a second driving level when movement of the lens barrel component is not detected from the movement detection signal within the limit time,
    wherein torque of the second driving level is greater than torque of the first driving level.

2. The method of claim 1, wherein the determining a limit time comprises determining the limit time according to the logic level of the movement detection signal.

3. The method of claim 1, wherein the detecting the movement comprises detecting the movement of the lens barrel component from an edge at which the logic level of the movement detection signal changes.

4. The method of claim 1, further comprising, after the changing a driving level:
- detecting the movement detection signal from the lens barrel when the lens barrel operates in the second driving level;
- determining a limit time with respect to the second driving level;
- detecting the movement of the lens barrel component from the movement detection signal when the lens barrel operates in the second driving level; and
- determining that driving of the lens barrel is not successful when the movement of the lens barrel component is not detected from the movement detection signal within the limit time with respect to the second driving level.

5. A lens barrel driving apparatus comprising:
- a movement detection signal detecting unit configured to detect a movement detection signal that indicates an operation of a lens barrel that operates using a stepping motor, the movement detection signal provided from a photo interrupter or a photo reflector comprised in the lens barrel;
- a limit time determining unit configured to determine a limit time during which movement of a lens barrel component is detected based on the movement detection signal;
- a movement detection unit configured to detect the movement of the lens barrel component from the movement detection signal;
- a driving direction determining unit that determines a driving direction of the lens barrel according to a logic level of the movement detection signal; and
- a driving level changing unit configured to change a driving level of the stepping motor from a first driving level to a second driving level when movement of the lens barrel component is not detected from the movement detection signal within the limit time,
- wherein torque of the second driving level is greater than torque of the first driving level.

6. The lens barrel driving apparatus of claim 5, wherein the limit time determining unit determines the limit time according to the logic level of the movement detection signal.

7. The lens barrel driving apparatus of claim 5, wherein the movement detection unit detects the movement of the lens barrel component from an edge at which the logic level of the movement detection signal changes.

8. The lens barrel driving apparatus of claim 5, wherein the limit time determining unit determines the limit time with respect to the second driving level when a driving level of the stepping motor is changed to the second driving level, and
- the lens barrel driving apparatus further comprises a driving determining unit that determines that driving of the lens barrel is not successful when the movement of the lens barrel component is not detected from the movement detection signal within the limit time with respect to the second driving level when the driving level is changed to the second driving level.

9. A digital photographing apparatus comprising:
- an image pickup device on which an image of a subject is formed from an optical signal transmitted through a lens barrel; and
- a lens barrel driving apparatus comprising:
  - a movement detection signal detecting unit configured to detect a movement detection signal that indicates an operation of the lens barrel that operates using a stepping motor, the movement detection signal provided from a photo interrupter or a photo reflector comprised in the lens barrel;
  - a limit time determining unit configured to determine a limit time during which movement of a lens barrel component is detected based on the movement detection signal;
  - a movement detection unit configured to detect the movement of the lens barrel component from the movement detection signal;
  - a driving direction determining unit that determines a driving direction of the lens barrel according to a logic level of the movement detection signal; and
  - a driving level changing unit configured to change a driving level of the stepping motor from a first driving level to a second driving level when movement of the lens barrel component is not detected from the movement detection signal within the limit time,
  - wherein torque of the second driving level is greater than torque of the first driving level.

10. The digital photographing apparatus of claim 9, wherein the limit time determining unit determines the limit time with respect to the second driving level when a driving level of the stepping motor is changed to the second driving level, and
- the lens barrel driving apparatus further comprises a driving determining unit that determines that driving of the lens barrel is not successful when the movement of the lens barrel component is not detected from the movement detection signal within the limit time with respect to the second driving level when the driving level is changed to the second driving level.

11. A non-transitory computer readable storage medium having stored thereon a program executable by a processor for performing a method of driving a lens barrel, the method comprising:
- detecting a movement detection signal that indicates an operation of a lens barrel that operates using a stepping motor, the movement detection signal provided from a photo interrupter or a photo reflector comprised in the lens barrel;
- determining a limit time during which movement of a lens barrel component is detected based on the movement detection signal;
- detecting the movement of the lens barrel component from the movement detection signal;
- determining a driving direction of the lens barrel according to a logic level of the movement detection signal; and
- changing a driving level of the stepping motor from a first driving level to a second driving level when the movement of the lens barrel component is not detected from the movement detection signal within the limit time,
- wherein torque of the second driving level is greater than torque of the first driving level.

12. The non-transitory computer readable storage medium of claim 11, wherein the determining a limit time comprises determining the limit time according to the logic level of the movement detection signal.

13. The non-transitory computer readable storage medium of claim 11, wherein the detecting movement comprises detecting the movement of the lens barrel component from an edge at which the logic level of the movement detection signal changes.

14. The non-transitory computer readable storage medium of claim 11, wherein the method further comprises, after the changing a driving level:

detecting the movement detection signal from the lens barrel when the lens barrel operates in the second driving level;

determining a limit time with respect to the second driving level;

detecting the movement of the lens barrel component from the movement detection signal when the lens barrel operates in the second driving level; and determining that driving of the lens barrel is not successful when the movement of the lens barrel component is not detected from the movement detection signal within the limit time with respect to the second driving level.

* * * * *